United States Patent
Zeis

(10) Patent No.: US 8,074,043 B1
(45) Date of Patent: Dec. 6, 2011

(54) METHOD AND APPARATUS TO RECOVER FROM INTERRUPTED DATA STREAMS IN A DEDUPLICATION SYSTEM

(75) Inventor: Michael John Zeis, Minneapolis, MN (US)

(73) Assignee: Symantec Corporation, Mountain View, CA (US)

( * ) Notice: Subject to any disclaimer, the term of this patent is extended or adjusted under 35 U.S.C. 154(b) by 484 days.

(21) Appl. No.: 12/363,207

(22) Filed: Jan. 30, 2009

(51) Int. Cl.
*G06F 12/00* (2006.01)

(52) U.S. Cl. .................. 711/171; 711/162; 711/E12.002

(58) Field of Classification Search .................. None
See application file for complete search history.

(56) References Cited

U.S. PATENT DOCUMENTS

| | | | |
|---|---|---|---|
| 2010/0082529 A1* | 4/2010 | Mace et al. | 707/609 |
| 2010/0082547 A1* | 4/2010 | Mace et al. | 707/648 |
| 2011/0022825 A1* | 1/2011 | Spackman | 712/240 |

\* cited by examiner

*Primary Examiner* — Kevin Verbrugge
(74) *Attorney, Agent, or Firm* — Campbell Stephenson LLP

(57) ABSTRACT

Detection and proper deduplication of a re-started data stream in a segmentation analysis-based deduplication system are provided by retaining information about a previous data stream and using that information when performing segmentation of the re-started data stream. Information such as a segment size associated with a last data object received in the previous data stream and a record of how much data was present in the last segment associated with the previous data stream is retained. The retained segment size information is used to set a first data object segment size of the re-started data stream, and the size of last segment information is used to determine how much information should be put in the first segment associated with the re-started data stream in order to maintain proper alignment of the remainder of the segments for the first data object in the re-started data stream for deduplication.

20 Claims, 12 Drawing Sheets

METHOD AND APPARATUS TO RECOVER FROM INTERRUPTED DATA STREAMS IN A DEDUPLICATION SYSTEM

FIELD OF THE INVENTION

The present invention relates to the field of data storage, and particularly to providing for data stream interruption while providing data to a single instance storage data store.

BACKGROUND OF THE INVENTION

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a piece of information only one time. Thus, in a backup scenario, if a piece of information is stored in multiple locations within an enterprise, that piece of information will only be stored one time in a deduplicated backup storage area. Or if the piece of information does not change between a first backup and a second backup, then that piece of information will not be stored during the second backup as long as that piece of information continues to be stored in the deduplicated backup storage area. Data deduplication can also be employed outside of the backup context thereby reducing the amount of active storage occupied by duplicated files.

In order to provide for effective data deduplication, data is divided in a manner that provides a reasonable likelihood of finding duplicated instances of the data. For example, data can be examined on a file-by-file basis, and thus duplicated files (e.g., operating system files and application files and the like) would be analyzed and if the entire file had a duplicate version previously stored, then deduplication would occur. A drawback of a file-by-file deduplication is that if a small section of a file is modified, then a new version of the entire file would be stored, including a potentially large amount of data that remains the same between file versions. A more efficient method of dividing and analyzing data, therefore, is to divide file data into consistently-sized segments and to analyze those segments for duplication in the deduplicated data store. Thus, if only a portion of a large file is modified, then only the segment of data corresponding to that portion of the file need be stored in the deduplicated data storage and the remainder of the segments will not be duplicated.

One mechanism for breaking data into a series of segments is for a client of the deduplication system to provide a stream of data to a deduplication server. Such a stream of data can include numerous data objects (e.g., backed-up files). Depending upon a type of a data object, the deduplication system can select an appropriate segment size and store data from the incoming data stream into a series of appropriately sized segments. A potential problem with such a scheme of breaking a data stream into segments is that a data stream may abnormally terminate during the course of providing data to a segment. Such an abnormal termination may result in the last segment of that transmission being incomplete. In addition, upon the resumption of the transmission of the data stream from the client (or a fallback client) data in subsequent segments will be shifted by an amount of data equal to the data placed in the final incomplete segment of the previous transmission stream. Such shifting will make the subsequent segments completing the data object ineligible for deduplication in the single instance data store. A further problem may be that since the segment sizes are chosen to be optimal for a particular object, since the second data stream may resume mid-data object, the stream segmenter of the deduplication system would not be able to select an appropriate segment size for the remainder of the data object in the beginning of the second data stream.

It is therefore desirable for a data deduplication system to have a stream segmenter that can associate a data stream received after an abnormal termination of a previous data stream with that previous data stream in order to determine an appropriate segment size for the remainder of a data object received at the beginning of the second data stream. Further, it is desirable for the stream segmenter of the deduplication server to perform a segment splice, allowing fixed size segmentation of the data object to proceed at the proper segment alignment for deduplication to occur, as if the first data stream had never been interrupted.

SUMMARY OF THE INVENTION

Embodiments of the present invention provide a method, apparatus and computer-readable storage medium having instructions for detection and proper deduplication of a re-started data stream in a segmentation analysis-based deduplication system by retaining information about a previous data stream and using that information when performing segmentation of the re-started data stream. One embodiment of the present invention provides such data stream re-start capability by determining whether a received data stream associated with a unique identifier is the first data stream associated with the unique identifier. A segment of memory to contain a first amount of data from the data stream is allocated, the size of which is determined either from an identification of a type of data object received in the current data stream or a size of a last segment of a previous data stream associated with the unique identifier, if the current data stream is not the first data stream associated with the unique identifier.

One aspect of the above embodiment determines whether the current data stream is the first data stream associated with a unique identifier by receiving a sequence number associated with the current data stream and the unique identifier and comparing the unique identifier/sequence number pair of the current data stream against unique identifier/sequence number pairs of previously received and terminated data streams. A further aspect of this embodiment can store the unique identifier/sequence number pair of the current data stream for future comparison against subsequently received data stream unique identifier/sequence number pairs. Another aspect of this embodiment can store the size of the segment with the unique identifier/sequence number pair for the data stream.

Another aspect of the above embodiment of the present invention determines the size of the segment by reading the first data object type from the current data stream and selects a segment size corresponding to the first data object type, if the current data stream is the first data stream associated with the unique identifier. If the current data stream is not the first data stream associated with the unique identifier, then this aspect of the above embodiment of the present invention determines the segment size of a last data object of the previous data stream associated with the unique identifier. A further aspect of the above embodiment determines the segment size for the first segment of the re-started data stream by subtracting the size of the last segment of the previous data stream associated with the unique identifier from the segment size of the last data object of the previous data stream associated with the unique identifier.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
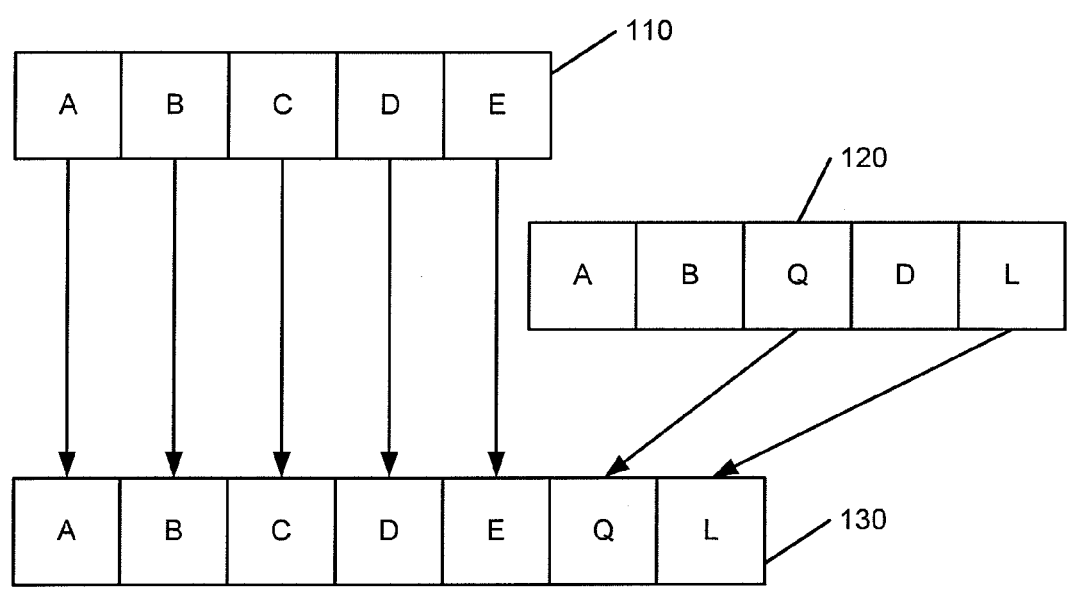
FIG. 1 is a simplified block diagram illustrating a method of data deduplication usable in conjunction with embodiments of the present invention.

Embodiments of the present invention provide for detection and proper deduplication of a re-started data stream in a segmentation analysis-based deduplication system by retaining information about a previous data stream and using that information when performing segmentation of the re-started data stream. Embodiments of the present invention can retain information such as a unique identifier of the previous data stream, an indicator of whether the previous data stream was the first or one of a sequence of data streams associated with the unique identifier, a segment size associated with the last data object received in the previous data stream, and a record of how much data was present in the last segment associated with the previous data stream. Embodiments of the present invention can then use the information from the previous data stream in determining whether a second data stream (e.g., the re-started data stream) is associated with the previous data stream (e.g., has the same unique identifier) and is the next data stream in the sequence of data streams associated with that unique identifier. If the second data stream is associated with the previous data stream, then embodiments of the present invention can use the retained segment size information to set a segment size for the first data object of the second data stream, and use the size of last segment information to determine how much information should be put in the first segment associated with the second data stream in order to maintain proper alignment of the remainder of the segments for the first data object in the second data stream to allow for proper deduplication.

A general concept behind data deduplication is to reduce an amount of storage needed for enterprise data by eliminating duplicated data content. One embodiment of a deduplicated data storage area is a single instance storage. In a single instance storage volume, only a single instance of a piece of data is stored. A common use of a single instance storage is in maintaining data backups for servers and other computing clients in a network. For each backup, only a single instance of information duplicated in the network will be stored in the single instance storage area. In addition, for subsequent backups occurring over time, data items that have not changed from one backup to another need not be stored in the subsequent backup. In this manner, significant savings in data storage space can be realized.

As an example of data deduplication in a backup environment, an initial full backup of a file server can be performed in which the data included in the backup is divided and identified in a manner as discussed below. Subsequent daily backups of the file system involve identifying new or changed segments of data using the same data identification system as performed with the full backup and then storing only the new or changed data in the single instance storage area. Depending upon the number of new or changed files in the file system, a reduction in the size of the backup subsequent to the initial full backup can be as much as 99%. The single instance storage approach to backups allows for very small daily backups with an ability to recover a full image from any backup on any day. The traditional distinction between a "full" backup and an "incremental" backup disappears since, although only new or changed data is saved in the single instance storage area, all the data that is backed up can be restored at any time using a single backup restore.

FIG. 1 is a simplified block diagram illustrating a method of data deduplication. Files 110 and 120 share identical content, but the files themselves are not completely identical. Each file is broken into segments: A, B, C, D, E for file 110 and A, B, Q, D, L for file 120. The data deduplication system will write file segments A, B, C, D, E, Q and L into the single instance storage area (130) and will not write file segments A, B and D from file 120 into the single instance storage area. Thus, if two data segments are the same, one can save space in a single instance storage area by only storing one copy of the segment and providing two pointers (e.g., one corresponding to file 110 and the other to file 120) to that segment.

As will be discussed in more detail below, in order to track a location of data for a file, metadata containing, for example, pointers to the data of a file can be stored in a metadata storage area.

Figure 2:
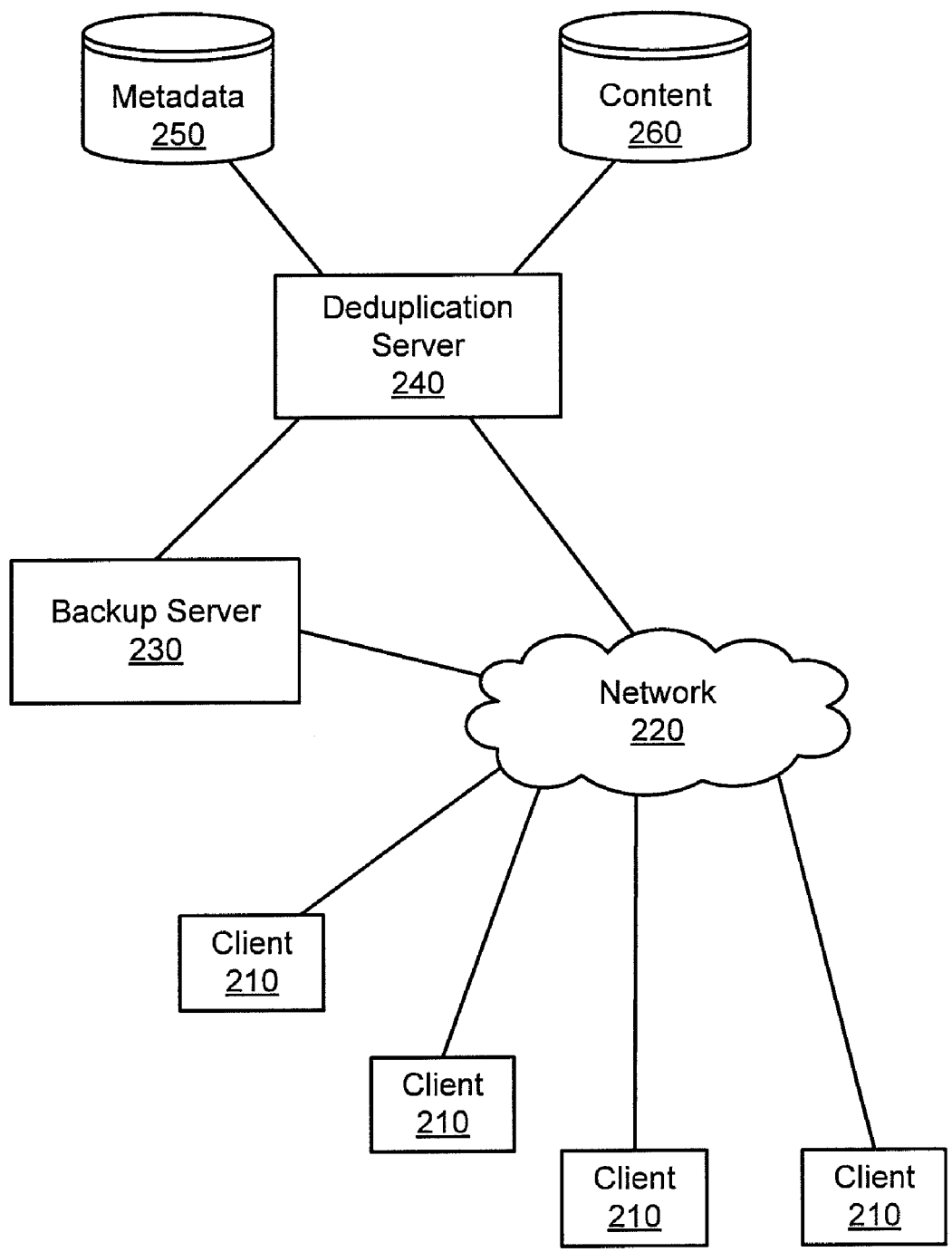
FIG. 2 is a simplified block diagram of a network incorporating a deduplication system usable in conjunction with embodiments of the present invention.

FIG. 2 is a simplified block diagram of a network incorporating a deduplication system usable with embodiments of the present invention. Client computers 210 are coupled to a network 220. Each client computer has access to one or more file systems that are stored in either storage volumes directly-coupled to each of the clients or by storage volumes that are served to the client computers by a storage area network (SAN), network attached storage (NAS), storage appliance and the like (not shown). Client computers can include, for example, servers and desktop nodes. Embodiments of network 220 can include, for example, a local area network, metro area network, wide area network, or any combination thereof.

Backup server 230 is also coupled to network 220. Backup server 230 is configured to, for example, manage administrative tasks related to backing up clients 210. Such tasks include communicating with clients 210 to initiate backup tasks on the clients, maintaining databases related to files and other information backed up from file systems associated with the clients, and managing or tracking resources storing backups of clients 210. In the system illustrated in FIG. 2, backup server 230 is further configured to communicate with deduplication server 240 for purposes of storing backups of client 210 in resources controlled by deduplication server 240. Such communication can be via network 220 or via a direct link between the backup server and the deduplication server. Information that can be provided by backup server 230 to deduplication server 240 can include a unique identification associated with each data stream provided by clients 210 to the deduplication server. The backup server can also provide sequence number identification for each uniquely identified data stream. Deduplication server 240 can then use such information to associate received data streams from clients in accord with embodiments of the present invention, as will be discussed more fully below.

Deduplication server 240 is coupled to network 220 and performs a variety of tasks related to management and implementation of deduplication services for the system illustrated in FIG. 2. Deduplication server 240 can include one or more physical servers configured to perform a variety of tasks related to deduplication. Deduplication server 240 is in turn coupled to a storage pool for deduplicated data that includes one or more metadata volumes 250 and one or more content volumes 260.

Figure 3:
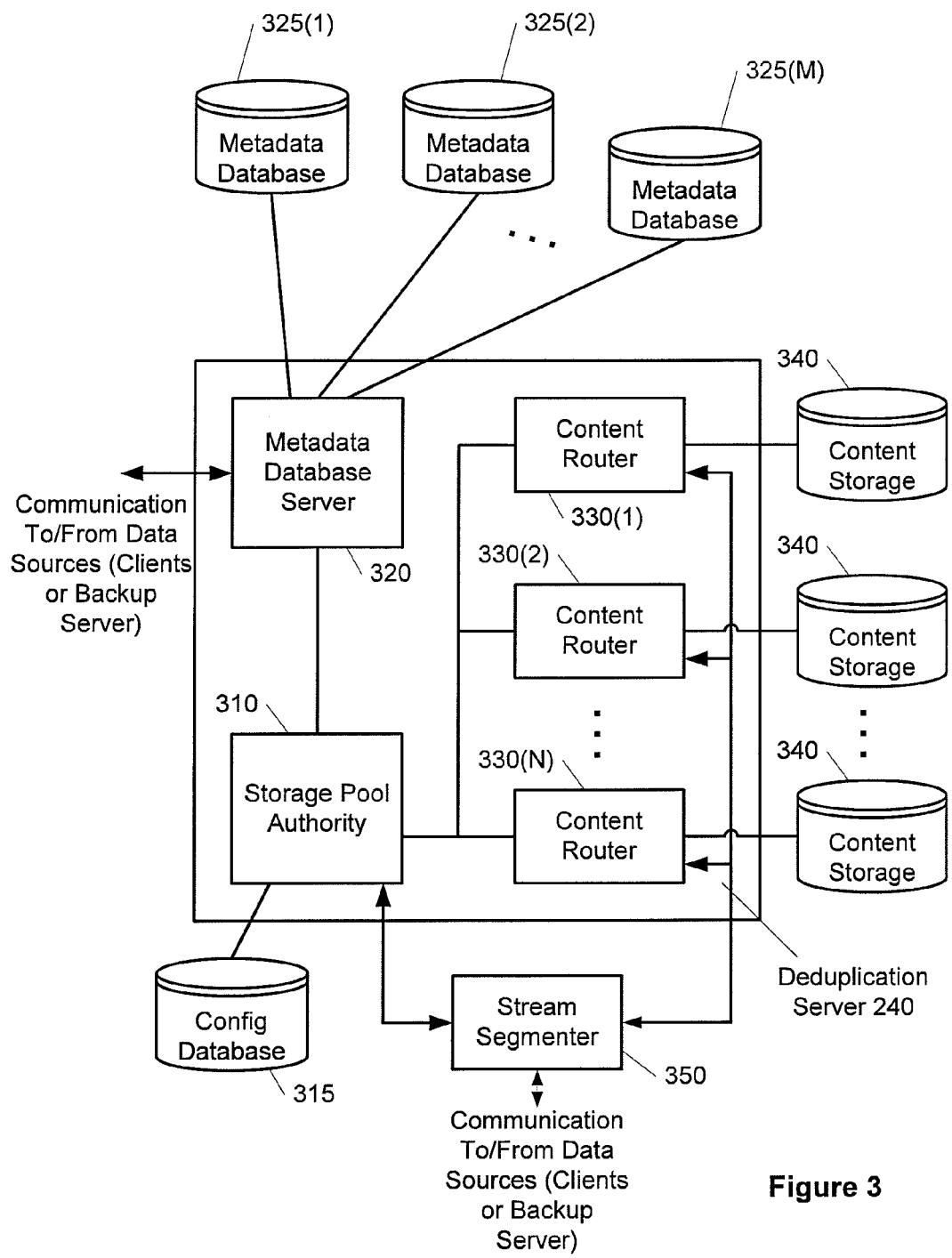
FIG. 3 is a simplified block diagram illustrating components of deduplication server 240.

FIG. 3 is a simplified block diagram illustrating components of deduplication server 240. Storage pool authority module 310 performs administration tasks related to management of the storage pool resources. Among such administrative tasks include setting policies for storage resources, such as retention times for data stored, types of metadata associated with stored data that is required, size of data segments, and the like. Storage pool authority module 310 can also perform scheduling-related tasks, management of concurrently arriving data streams, and management of data being provided to content storage (e.g., locations for storing various incoming data). Storage pool authority module 310 can store configuration information for the storage pool in a configuration database 315.

Deduplication server 240 also includes a metadata database server module 320 that communicates with storage pool authority 310 or with data sources (e.g., clients 210 or backup server 230). Metadata database server module 320 is configured to distribute metadata received from storage pool authority 310 or the data sources to one or more metadata database engines 325(1)-(M). Such metadata includes information about the nature of the data stored by the storage pool. The metadata stored by metadata database engines 325(1)-(M) will be discussed in greater detail below.

Deduplication server 240 also includes one or more content routers 330(1)-(N) that are communicatively coupled to storage pool authority 310 and to data sources (e.g., clients 210 or backup server 230). The content routers are configured to receive data content being stored in the storage pool managed by deduplication server 240 and to manage the storage of that data in one or more content storage volumes 340. Storage pool authority module 310 can be configured to distribute data in a fair and efficient manner across all content routers 330(1)-(N).

Deduplication server 240 also includes stream segmenter module 350 that can receive data streams and other communication from the various data sources (e.g., clients 210 and backup server 230) and perform tasks related to segmenting in the incoming data streams in preparation for deduplication storage, as will be discussed more fully below. Stream segmenter 350 can also receive the identification information and other information related to previous data streams provided by the backup server or the storage pool authority 310, as will be discussed more fully below.

It should be recognized that modules 310, 320, 330 and 350 can be executed by one or more physical servers configured to perform the functionality required by the various modules.

Figure 4A:
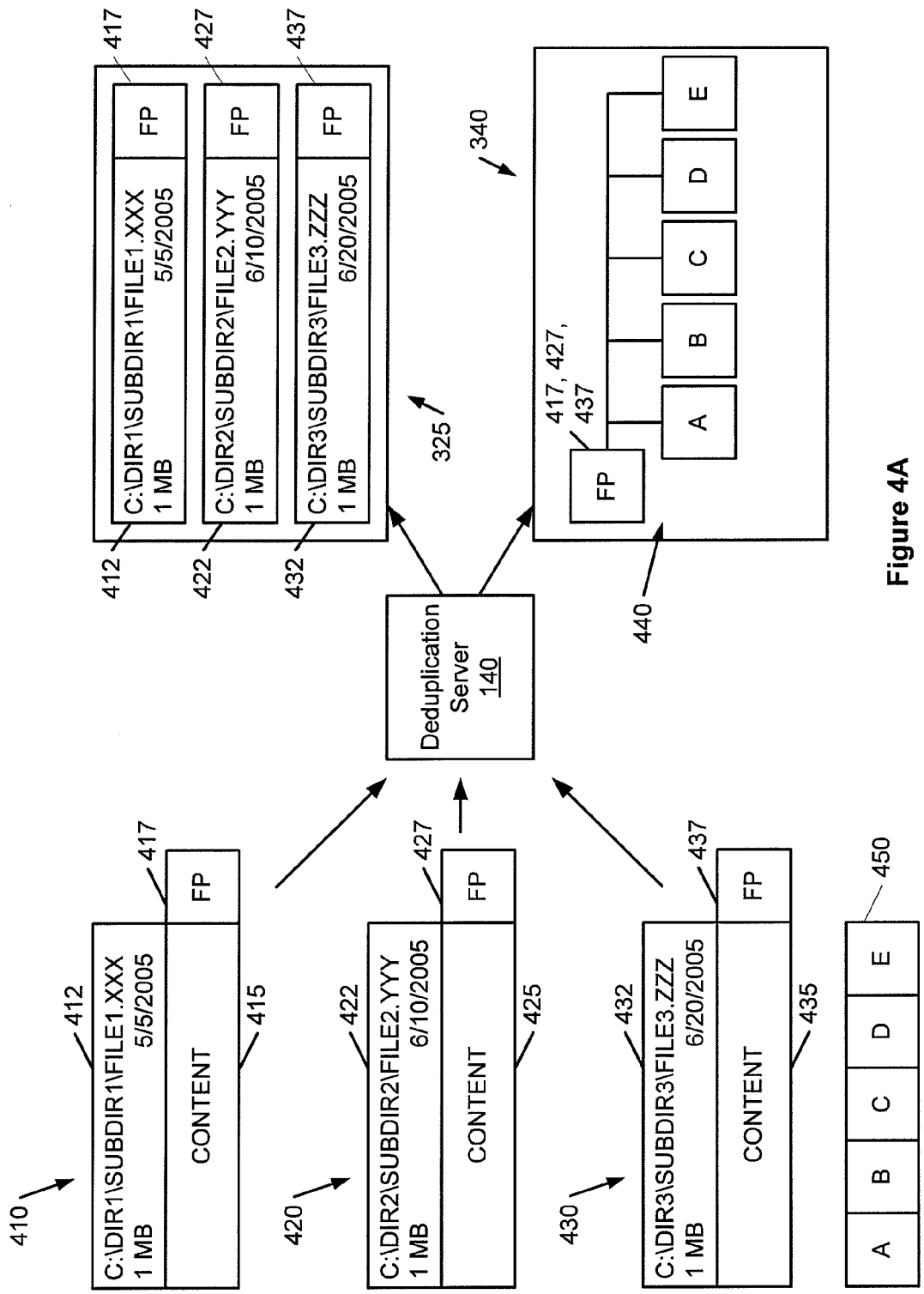
FIG. 4A is a simplified block diagram illustrating an example of information stored by metadata database engines and content routers of a deduplication system usable in conjunction with embodiments of the present invention.

FIG. 4A is a simplified block diagram illustrating an example of information stored by the metadata database engines and the content routers of a deduplication system capable of implementing embodiments of the present invention. FIG. 4A illustrates client files 410, 420 and 430, each of which contains identical content. Files 410, 420 and 430 can be located on the same client or on different clients. Each file is associated with metadata that describes the file (412, 422, 432), including, for example, the filename, size of the file, and a modification date. Each file also contains data content associated with the file (415, 425, 435). Identity of the content of the files is established by a fingerprint generated using the content of each file (417, 427, 437). The fingerprint of the file content is generated, for example, using a hash or checksum process sufficient to uniquely identify the file content.

A deduplication process can proceed in the following manner. If, for example, file 410, 420 and 430 are being backed up, file 410 is provided to deduplication server 140. Metadata 412 associated with file 410 is provided to a metadata database engine 325 along with the associated fingerprint 417. Content 415 of file 410 is divided into a set of segments A, B, C, D and E (450) (e.g., by stream segmenter 350) and these segments are provided to a content router 330 for storage in a content storage volume 340 along with the associated fingerprint 417 as a storage object 440. Thus, the unique fingerprint 417 serves as a link between the information stored in the metadata database and the file content file stored in the content storage volume. In one embodiment of the present invention, fingerprint 417 is generated by first determining a separate segment fingerprint for each of segments A, B, C, D and E using a hashing computation and then combining or hashing those segment fingerprints values to result in fingerprint 417.

When file 420 is provided to deduplication server 140, metadata 422 is provided to the metadata database 325 along with fingerprint 427. Deduplication server 140 then checks to see if data associated with fingerprint 427 has already been stored in content storage volume 340. Since storage object 440 has already been provided to content storage volume 340, that data is not duplicated in the content storage volume. A similar process occurs for file 430 in which metadata 432 and the associated fingerprint 437 are stored in the metadata database but no duplication of data is made in content storage volume 340.

Figure 4B:
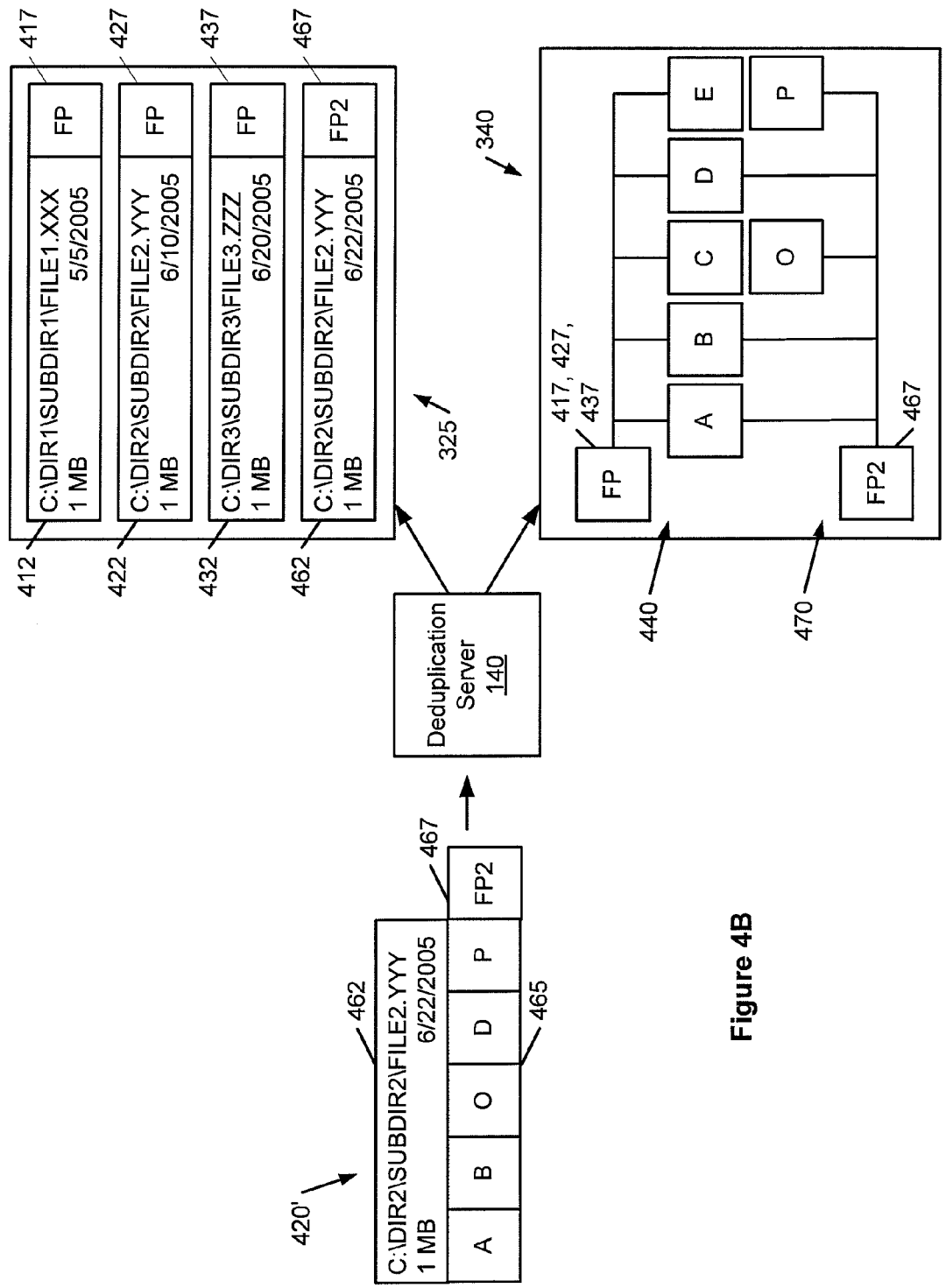
FIG. 4B is a simplified block diagram illustrating information stored in the event of a change of one of the files illustrated in FIG. 4A.

FIG. 4B is a simplified block diagram illustrating information stored in the event of a change of one of the files illustrated in FIG. 4A. FIG. 4B illustrates a change occurring in file 420 creating a file 420'. Metadata 462 associated with file 420' reflects a new modification date. Content 465 is illustrated showing that original segments C and E of file 420 have been changed to segments O and P, while the other segments remain the same. Since content 465 is different from original content 425, a different fingerprint 467 is generated.

When file 420' is provided to deduplication server 140, file metadata 462 is provided to metadata database 325 along with new fingerprint 467. Upon establishing that a storage object associated with fingerprint 467 has not been previously stored in content storage volume 340, file content 465 is provided to a content router associated with content storage volume 340. The content router can establish that of all the segments comprising file content 465, only segments O and P have yet to be stored in the content storage volume and fingerprint 467 is associated with the shared previously stored segments and the modified segment. One example of how a content router can determine whether a data segment has been previously stored is by maintaining checksums of each stored data segment and comparing a checksum of a data segment to be stored against those already stored. That association of fingerprint 467 and the previously stored and modified segments is stored as a storage object 470.

The above discussion illustrates a process of dividing a file into segments and providing those segments to a single instance storage system for deduplication. Deduplication of data in a content storage volume by a content router is then carried out on a segment-by-segment basis. This allows for changes in part of a file to be reflected by storing only those segments that have been modified. A default segment size may be chosen for a volume in a manner to optimize management of information and to increase the likelihood of duplicate segments. But such a default segment size may not provide for optimal management of data in the deduplication server. For example, if the default segment size is too small, then a deduplication server can be overwhelmed by having to manage metadata and data for a large number of segments. If the default segment size is too large, then the likelihood of duplicate segments is reduced for a typical file. Rather than selecting a default segment size for the entire content volume, embodiments of the present invention provide for varying segment sizes based upon a type of data object being stored in the deduplication server. This allows for choosing an optimal segment size for a particular type of file. For example, a file object containing sound or video data will have a low likelihood of having duplicate data segments with a second file unless the second file is a copy of the first file. In such a case, a large segment size (e.g., one or more megabytes) may be reasonable. On the other hand, other types of data objects may include data that is largely static but also has parts of which may be altered (e.g., text documents and database storage files). In such a case, a smaller segment size (e.g., 128 k bytes) is reasonable to capture both the static sections of data and the changing sections of data in such a way that there is a high probability of duplicate segments with those previously stored in the deduplication server.

Figure 5:
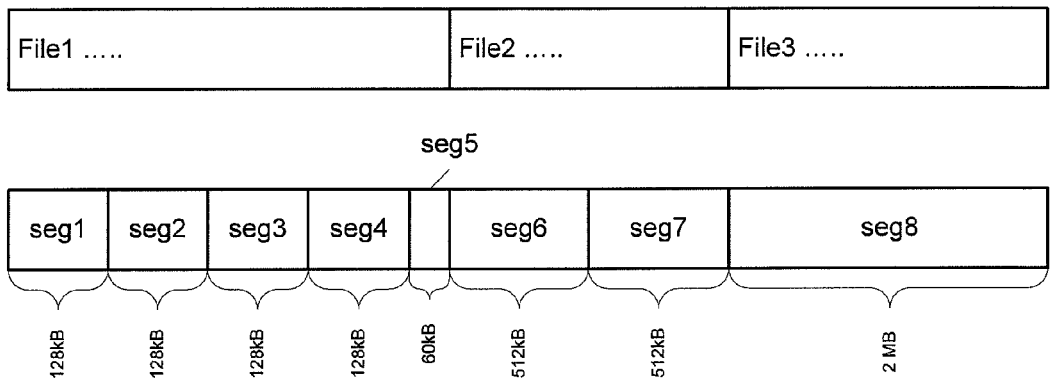
FIG. 5 illustrates varying segment sizes for different data objects in a data stream as employed with embodiments of the present invention.

FIG. 5 illustrates the concept of varying segment sizes for different data objects in a data stream. As a stream segmenter 350 receives a data stream including File1, the stream segmenter selects a segment size based upon the type of object of File1. As illustrated, stream segmenter 350 chooses a default segment size for File1 of 128 k bytes. Segments 1-4 of File1 are each of the default segment size and are filled with data from the data stream. Segment 5 is filled with data until the beginning of data object File2 is received in the data stream. At that point, segment 5 is closed containing the amount of data received to complete File1 (e.g., as illustrated, 60 k bytes). The stream segmenter determines the type of data object of File2, and selects a segment size of 512 k bytes for the segments containing data from File2. Segments 6 and 7, as illustrated, are each of 512 k bytes. Once again, when the data object containing File3 is received, the stream segmenter interprets the type of data object and selects a segment size of 2 megabytes. The process of receiving data objects in a data stream and placing that data into appropriately sized segments continues until the data stream transmission is terminated. Upon termination of the data stream transmission, the last segment being filled is closed.

As discussed above, as each segment is either filled to the determined capacity, or closed due to receipt of an indication of the beginning of the next data object in a data stream, or closed due to termination of the data stream, the segments are provided to content routers 330 for analysis and storage within the deduplication server's content stores 340. In order to select segment sizes for the various data objects, the stream segmenter can be programmed with expected data object types and corresponding segment sizes for those expected data object types. Further, the stream segmenter can have a default segment size in the event that a received data object does not have a preprogrammed optimal segment size.

A data stream from a client may be terminated prematurely or abnormally due to, for example, a network connection failure, a client crash, and the like. In the event of such a data stream termination, stream segmenter 350 will close the final segment of the terminated data stream as it would for a normal termination, as discussed above. Upon resumption of transmission of the data stream, the stream segmenter may receive data from the middle of a data object and from the middle of a segment. Therefore, stream segmenter 350 will be unable to select an optimal segment size for the data because it will be unable to determine the type of object being received. Further, even were the stream segmenter able to choose an appropriate segment size, data would be inserted at the beginning of a new segment and filling that segment and then moving on to the next segment. Thus, subsequent data in the data segments would be shifted from originally intended locations by an amount equivalent to the data found in the last segment of the abnormally terminated data stream.

Figure 6:
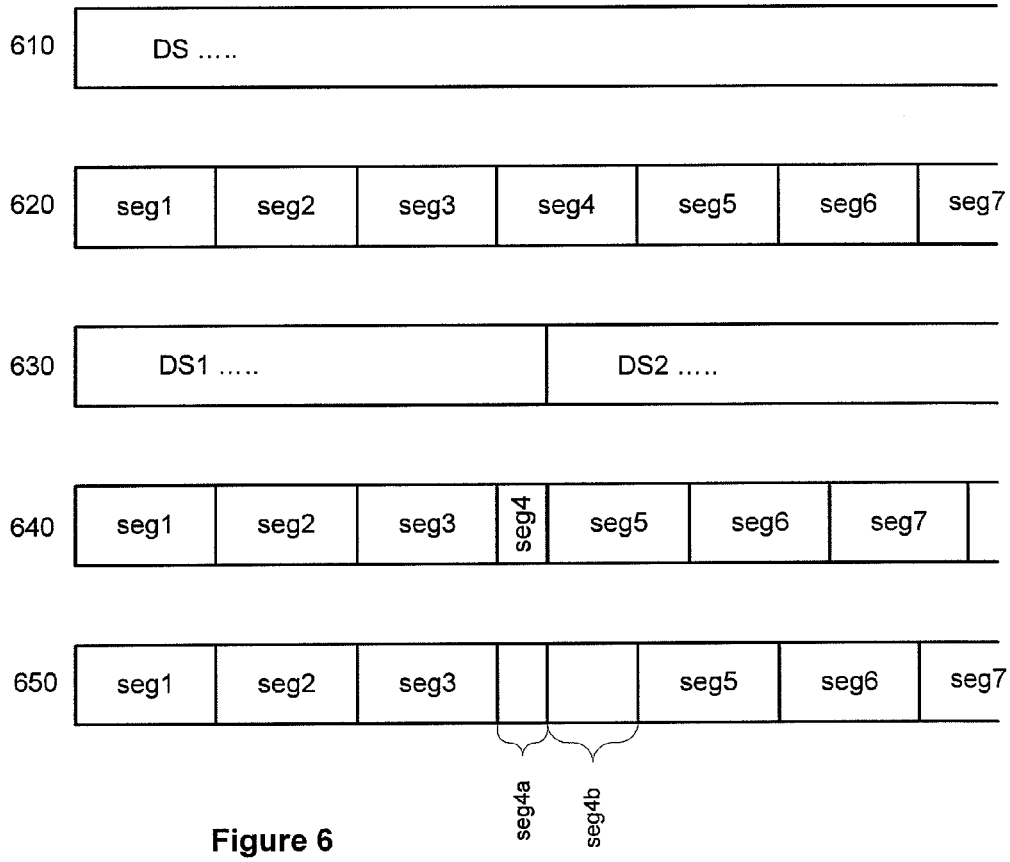
FIG. 6 is a simplified illustration of data shifting in segments that can occur in the event of an abnormal termination of a data stream.

FIG. 6 is a simplified illustration of the shifting that can occur in the event of an abnormal termination of a data stream. A data stream data object 610 is received and without an abnormal termination is broken into a segment stream 620. But in 630 the data stream is broken into two data streams, DS1 and DS2, due to an abnormal termination. As in 620, DS1 is broken up into segments, and the data in those segments aligns with that in segment stream 620 (e.g., data in segments 1-3 of segment stream 640 is the same as corresponding segments in segment stream 620). But because data stream DS1 abnormally terminates during the course of placing data in segment 4, segment 4 of segment stream 640 is not the same as segment 4 of segments 620 filled from the unterminated data stream. Upon resumption of the data stream, DS2, a new segment is formed to include the data received in DS2. The new segment does not contain the same data as segment 5 from segments 620 because it has been shifted by the amount received in DS1 for segment 4. Similarly, all subsequent segments will be shifted by that amount. Since the data in the segments is shifted, the segments do not contain the same data as those previously received and stored segments in the deduplication server and therefore those segments are not eligible for deduplication even though they were formed from the same data stream data object previously received in segment stream 620 (e.g., during a previous backup).

In order to avoid the shifting of data segments illustrated by 640, stream segmenter 350 can perform a "splicing" operation such as that illustrated by segment stream 650. As illustrated in 650, segments 1-3 are the same as those in segment stream 620. Because DS1 abnormally terminates during the filling of segment 4, segment 4a is prematurely closed and therefore does not match segment 4 of segment stream 620. Upon resumption of the data stream in DS2, stream segmenter 350 can form a reduced size data segment segment 4b that contains the data that would have completed segment 4 of data stream 620. Segments 5 and beyond are formed of the selected size for the data object and contain the same data as segments 5 and beyond of segment stream 620. Such splicing makes at least segments 5 and above eligible for deduplication processing.

In order to achieve the illustrated segment "splicing" operation in segment stream 650, stream segmenter 350 associates a re-started data stream (DS2) with a previous data stream that abnormally terminated (DS1). As discussed above, a backup server, or other central authority, can provide the clients with a unique identifier for each data stream transmitted from a client to the deduplication server. Such a unique identifier can be generated in a number of ways, for example, using a date and time of day for a random number generator seed. The unique identifier of a data stream can be provided to a deduplication server upon initiation of the data stream to the deduplication server from the client. In addition, the backup server or other central authority, can track a sequence number for a data stream associated with a unique identifier. That is, if a data stream is the first data stream associated with a unique identifier, then a sequence number associated with that data stream is one. If a data stream associated with a unique identifier is abnormally terminated, a re-started data stream associated with that unique identifier will be given a sequence number of two, and so on until the data stream associated with the unique identifier normally terminates. The sequence number associated with a data stream can also be provided to the deduplication server by the client at the time of initialization of transmission of the data stream to the deduplication server.

Upon receipt of a new data stream by the stream segmenter, the unique identifier and sequence number of the data stream can then be examined to determine whether the current data stream is a resumption of a previously terminated data stream. In order to accomplish this, stream segmenter 350 or another part of the deduplication server (e.g., storage pool authority 310) can retain unique identifier and sequence number pairs for previously received and terminated data streams. Upon receipt of a new data stream, the unique identifier and sequence number of that data stream can be compared with the saved unique identifier and sequence number pairs to determine whether the new data stream is associated with a previously terminated data stream. If so, then the stream segmenter can perform subsequent operations taking that association into account.

As discussed above, a segment size for a data object can be determined by the stream segmenter at the beginning of receipt of a data object. Segment size is dependent upon the type of data object. If a data stream begins mid-data object, the stream segmenter cannot determine an appropriate segment size. Thus, another piece of information that the stream segmenter can retain from a terminated data stream is the selected segment size for the last data object of that data stream. Then, when the data stream re-starts mid-data object, that stored segment size will be used for remaining data associated with that data object in the re-started data stream.

To avoid the segment data shifting issue discussed above, the stream segmenter further retains the amount of data placed into the last segment of the previous data stream. Using this information, stream segmenter 350 can then determine an amount of data necessary to complete a data segment of the selected size (e.g., by subtracting the amount of data actually put into the last segment of the previous data stream from the selected segment size) and generate a first segment for the re-started data stream of that smaller length. Once that initial segment is completed, subsequent segments can then be of the selected length for the data object. In this manner, as illustrated by segment stream 650 in FIG. 6, segments subsequent to the initial segment will align with segments expected from a uninterrupted data stream (e.g., segment stream 620).

Figure 7:
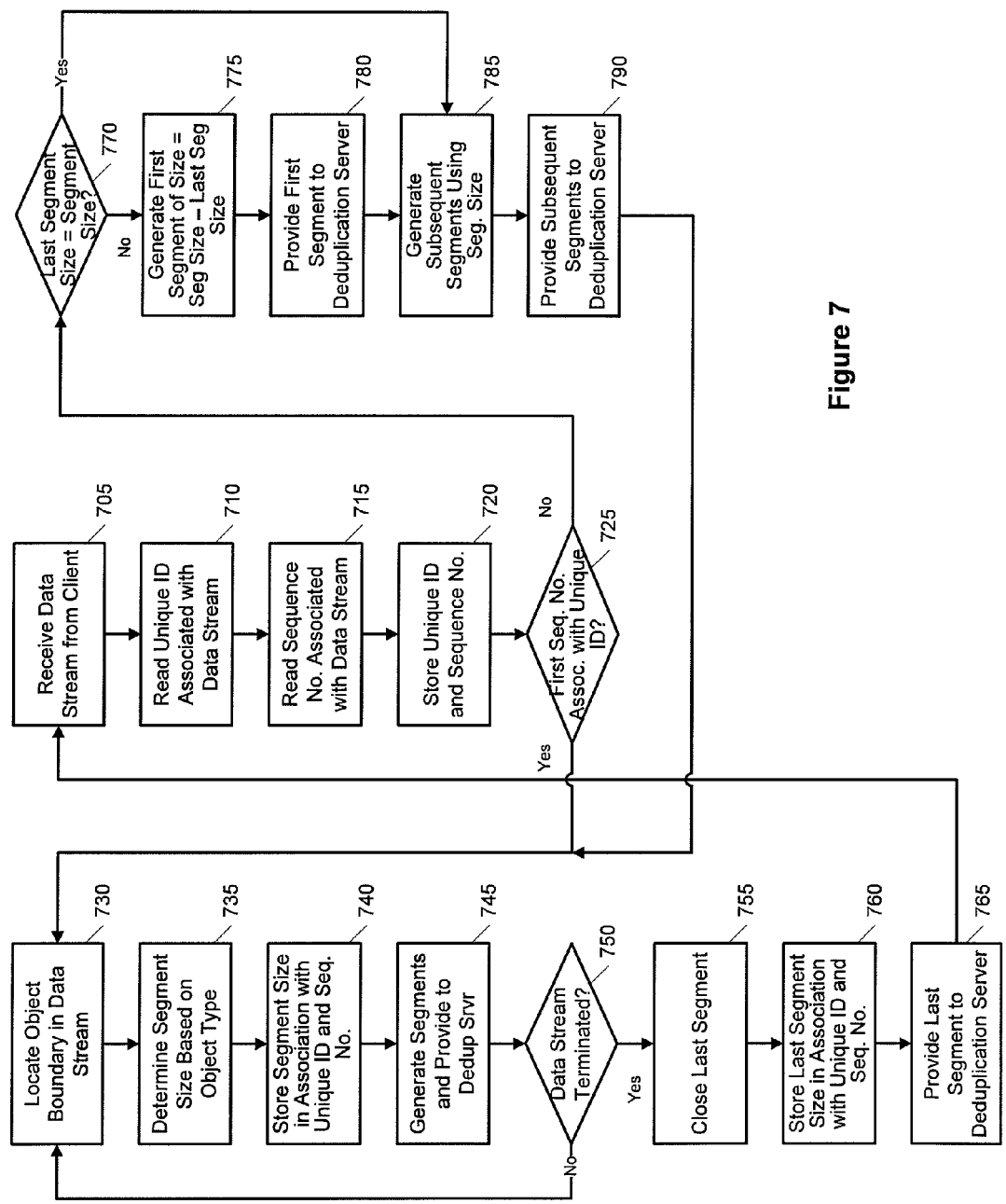
FIG. 7 is a simplified flow diagram illustrating steps performed in a "splicing" operation, in accord with one embodiment of the present invention.

FIG. 7 is a simplified flow diagram illustrating steps performed in a "splicing" operation, in accord with one embodiment of the present invention. A stream segmenter 350 receives a data stream from a client 210 (705). A unique identifier associated with the data stream is then read (710). As discussed above, the unique identifier can be provided by a central authority that tracks all identifiers for data streams from clients to a deduplication server. Each data stream associated with a flow of data from a client is uniquely identified from all others. In addition, a sequence number associated with the data stream is read (715). Again, as discussed above, a sequence number can be assigned or tracked by a central authority, and relates to the sequence of the current data stream associated with the unique identifier. The unique identifier and sequence number can be stored by the stream segmenter or in another associated module in the deduplication server (720). A determination can then be made as to whether the current data stream is first in a sequence associated with the unique identifier (725). Such a determination can be performed by determining whether the sequence number is greater than a predetermined baseline sequence number. Alternatively, a comparison can be performed between the unique identifier/sequence number pair and previous unique identifiers/sequence numbers stored by the stream segmenter or recalled from the deduplication server (e.g., the storage pool authority).

If the current data stream is the first data stream associated with the unique identifier, then the stream segmenter locates a data object boundary in the data stream (730). Based upon the type of data object, a segment size is determined (735) (e.g., by using a lookup table). The determined segment size will then be used for segments associated with the data object. The determined segment size is then stored in association with the unique identifier and sequence number of the data stream (740). Segments are then generated containing data stream data using the determined segment size starting at the data object boundary (745). The segments are provided to the deduplication server (e.g., a content router 330) for processing and possible storage by the deduplication server. If the data stream is not terminated, the process of placing data stream data in segment sizes is continued until the next object boundary in the data stream and then the process repeats (750).

If the data stream terminates, then the last segment containing data from the data stream is closed (755). The size of the last segment is stored in association with the unique identifier and sequence number of the data stream (760). The last segment is then provided to the deduplication server for processing and storage (765). The stream segmenter can then await a next data stream to process.

If it is determined that a data stream is not the first sequence number associated with a unique identifier (725), then the data stream is treated as a re-started data stream. The information stored related to the previous sequence number associated with the unique identifier is retrieved in order to determine the selected size of segments for the current data object and the size of the last segment stored in association with the previous sequence number. A determination is made as to whether the last segment size is the same as the selected segment size for the data object (770). If the last segment size is not equal to the selected segment size, then a first segment is generated of a size equal to the selected segment size minus the size of the last segment of the previous sequence number of the data stream (775). Once the data stream data has been placed in the adjusted size segment, that first segment is provided to the deduplication server for processing (780). Subsequent segments can then be generated to contain data stream data using a segment size equal to the selected segment size until the next data object boundary is reached in the data stream (785). Subsequent segments are provided to the deduplication server for processing (790). Once the data object boundary is reached, processing occurs as discussed above in steps 730-765.

In the manner illustrated by FIG. 7, two separate segment streams are tracked by the deduplication server. All the segments of the two segment streams can be analyzed for deduplication by the deduplication server against previously stored segments associated with other stored versions of the data object that was being transmitted at the time of abnormal termination of the first data stream. But the segment that was being formed at the time of abnormal termination of the first data stream and the truncated segment beginning the storage of the second data stream will not be able to be available for deduplication against a previously stored version of that segment from an uninterrupted data stream (e.g., compare segment 4 of segment stream 620 with segments 4A and 4B of segment stream 650). While this will not necessarily present a large duplication of data in a deduplication server's single instance data store for small segment sizes, for data objects having a large segment size (e.g., music and video files), such duplication can present a waste of storage space. An alternative mechanism for splicing the portions of the interrupted segment is contemplated by an alternative embodiment of the present invention. In the alternative embodiment, segments 4A and 4B of segment stream 650 are combined into a single segment that can then be analyzed by the deduplication server.

Figure 8A:
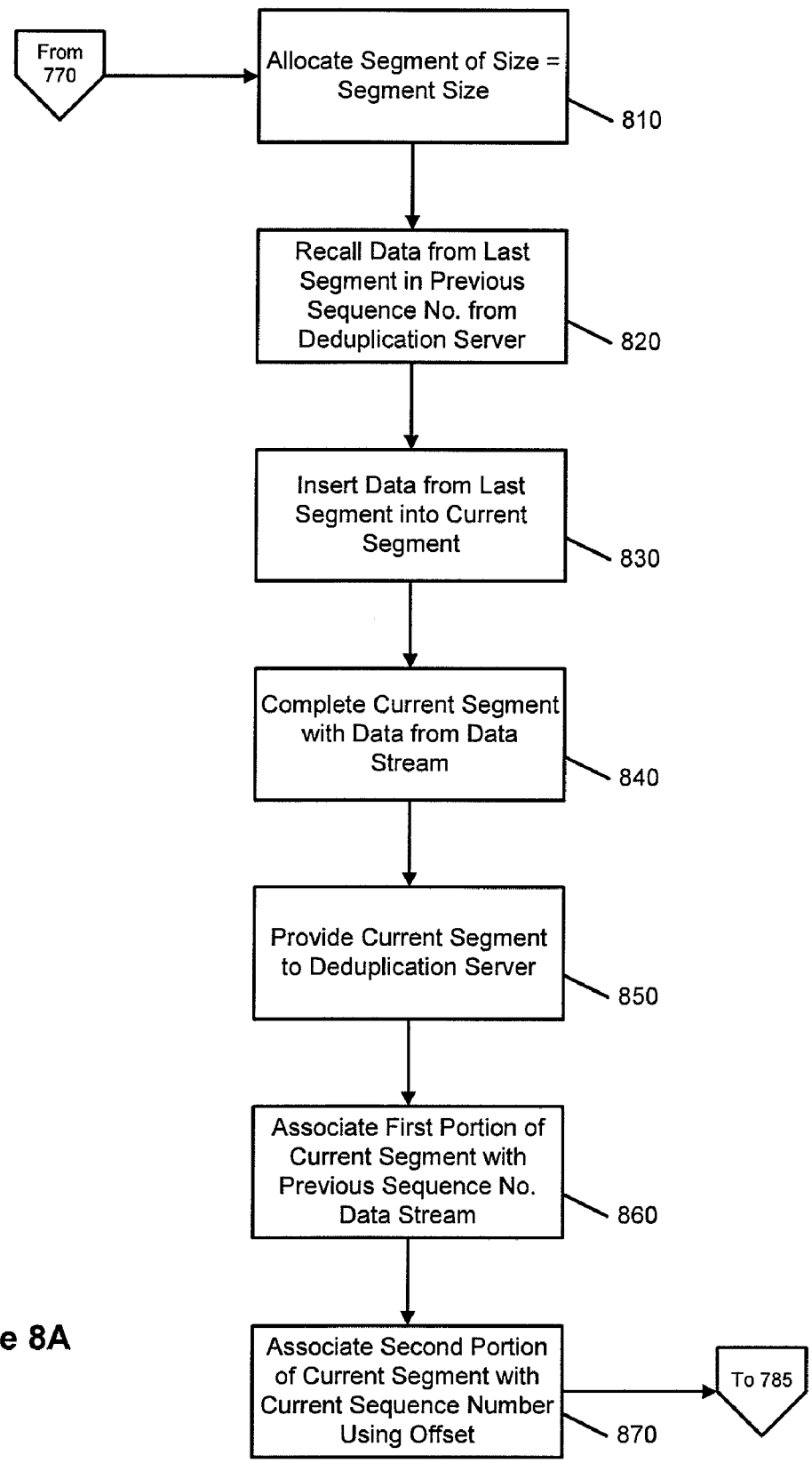
FIG. 8A is a simplified flow diagram illustrating steps involved with merging the last segment from a first data stream with the first segment from a second data stream, in accord with embodiments of the present invention.

FIG. 8A is a simplified flow diagram illustrating steps involved with merging the last segment from a first data stream with the first segment from a second data stream. The steps illustrated in FIG. 8A can be performed in place of steps 775 and 780 of FIG. 7. After a determination that the last segment size of the previous sequence number data stream did not equal the selected segment size (770), stream segmenter 350 can allocate a segment of a size equal to the selected segment size (810). Data from the last segment associated with the previous sequence number of the data stream is then recalled from the deduplication server (820) and inserted into the beginning of the current segment (830). The current segment is then completed with data from the current sequence number of the data stream (840). The current segment can then be provided to the deduplication server for processing (850). Such processing includes associating the first portion of the current segment with the previous sequence number of the data stream (860) and associating the second portion of the current segment with the current sequence number plus an offset equaling to the stored last segment size from the previous sequence number of the data stream (870). Processing then continues as presented in FIG. 7 at element 785.

In the manner presented in FIG. 8A, a single segment is created that bridges data from the previous sequence number of the data stream and the current sequence number of the data stream. That is, for example, segments 4A and 4B from segment stream 650 are combined into a single segment which can then be compared for deduplication purposes against previously stored segment 4 of segment stream 620. The deduplication server can then track that the first part of the merged segment is associated with the first sequence number of the data stream by modifying pointers associated with the first sequence of the data stream to related segments. The subsequent sequence number of the data stream is then tracked by the deduplication server as beginning with the merged segment at an offset point within that segment at which the data from the subsequent sequence number began.

Figure 8B:
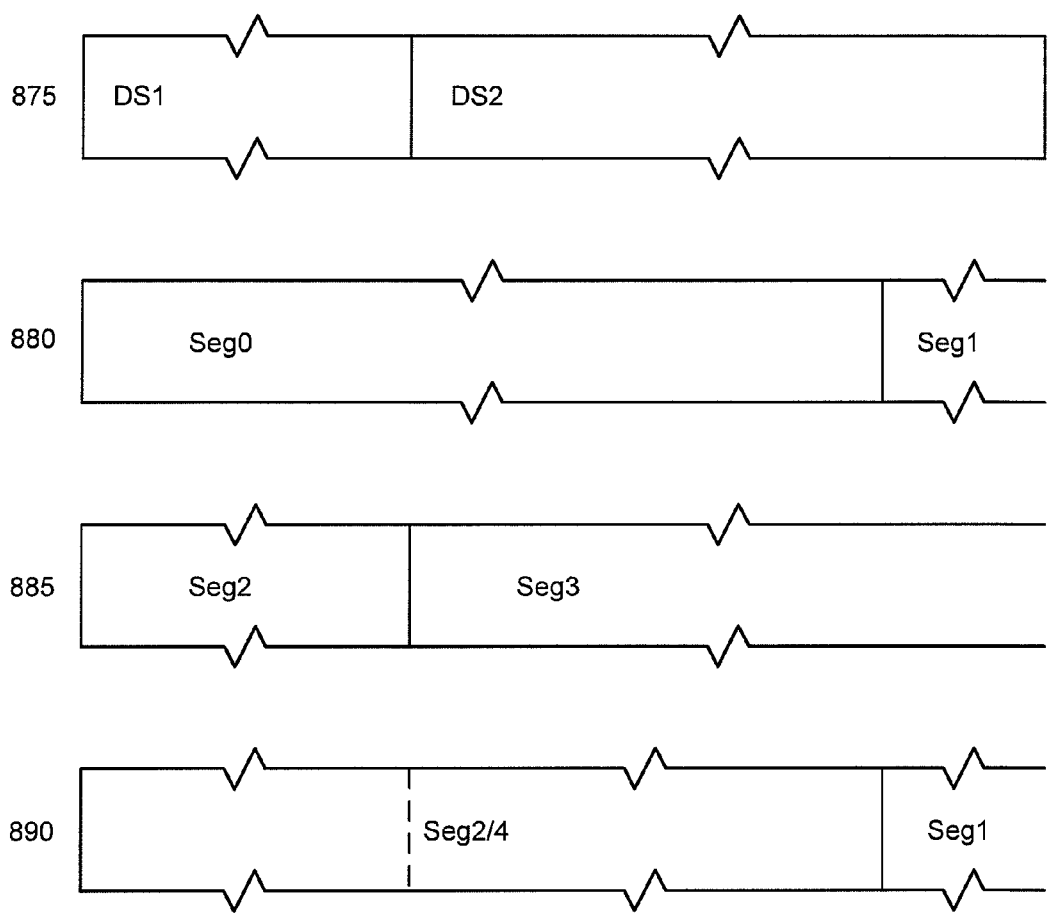
FIG. 8B is a simplified block diagram illustrating merging of segments as provided by the process of FIG. 8A.

FIG. 8B is a simplified block diagram illustrating merging of segments as provided in FIG. 8A. In FIG. 8B, a data stream 875 is interrupted and resumed, resulting in two data streams DS1 and DS2. As discussed above, DS2 resumes data stream 875 at the point which DS1 was terminated. Segment stream 880 illustrates segments that would have been formed had data stream 875 not abnormally terminated (e.g., as would be stored in the single instance data store from a previous backup data stream). Segments Seg0 and Seg1 are illustrated as long segments generated in response to, for example, a video or audio data object for which the only duplicate segments would be expected for a copy of the video or audio data object. Segment stream 885 illustrates segments formed in response to the interrupted data stream 875. Seg2 ends at the point in which data stream DS1 terminated. Seg3 begins at the point in which data stream DS2 begins. As illustrated, neither Seg2 nor Seg3 in segment stream 885 can be analyzed for deduplication against Seg0 stored from segment stream 880. In addition, data in segments following Seg3 in segment stream 885 will be shifted and therefore not eligible for deduplication against segments stored from a segment stream 880.

Segment stream 890 illustrates a result of employing the steps of FIG. 8A on the abnormally terminated data stream 875. A single, merged segment Seg2/4 is generated that contains the data from Seg2, which was stored when DS1 terminated, and data from the beginning of DS2. Merged segment Seg2/4 is the same length as Seg0 from segment stream 880, and is therefore eligible to be processed for deduplication against a previously stored version of Seg0. In addition, subsequent segment Seg1 of segment stream 890 can be checked against previously stored versions of Seg1 of, for example, segment stream 880 because there is no shifting of data in segments following the merged segment.

While the above-described embodiments provide for certain tasks being performed by one of a backup client, backup server and deduplication server, it should be noted that embodiments of the present invention are not limited to dividing task responsibility to a specific node. For example, stream segmenter tasks can be performed either by a backup agent executing on a client 210 or by deduplication server 240 or a specific module within deduplication 640 or a separate compute node configured to receive data streams from the clients and then provide segment streams to the deduplication server.

FIGS. 7 and 8A illustrate alternative embodiments for allocating data from a re-started data stream to a first data segment associated with the re-started data stream. Embodiments of the present invention are not limited to only one of the embodiments illustrated in FIG. 7 or 8A but can incorporate both. For example, if a determination is made that a last segment size associated with a previous sequence number of a data stream is not equal to the selected segment size (770), then a determination can be made as to whether to follow the method illustrated in elements 775-780 of FIG. 7 or 810-870 of FIG. 8A. Such a determination can be based upon, for example, the selected segment size for data from the current data object. If the selected segment size is above a selected segment threshold, then the mechanism illustrated by FIG. 8A can be selected. Any segment sizes below that threshold can be subject to the mechanisms illustrated in FIG. 7. In this manner, the mechanism of FIG. 7, which allows for a less burdensome tracking of information related to a merged (or "spliced") data segment is performed where one would not expect significant negative repercussions for having truncated segments stored in the deduplication server. But for large segment sizes, burdening the deduplication server with non-deduplicatable truncated segments can be avoided.

Figure 9:
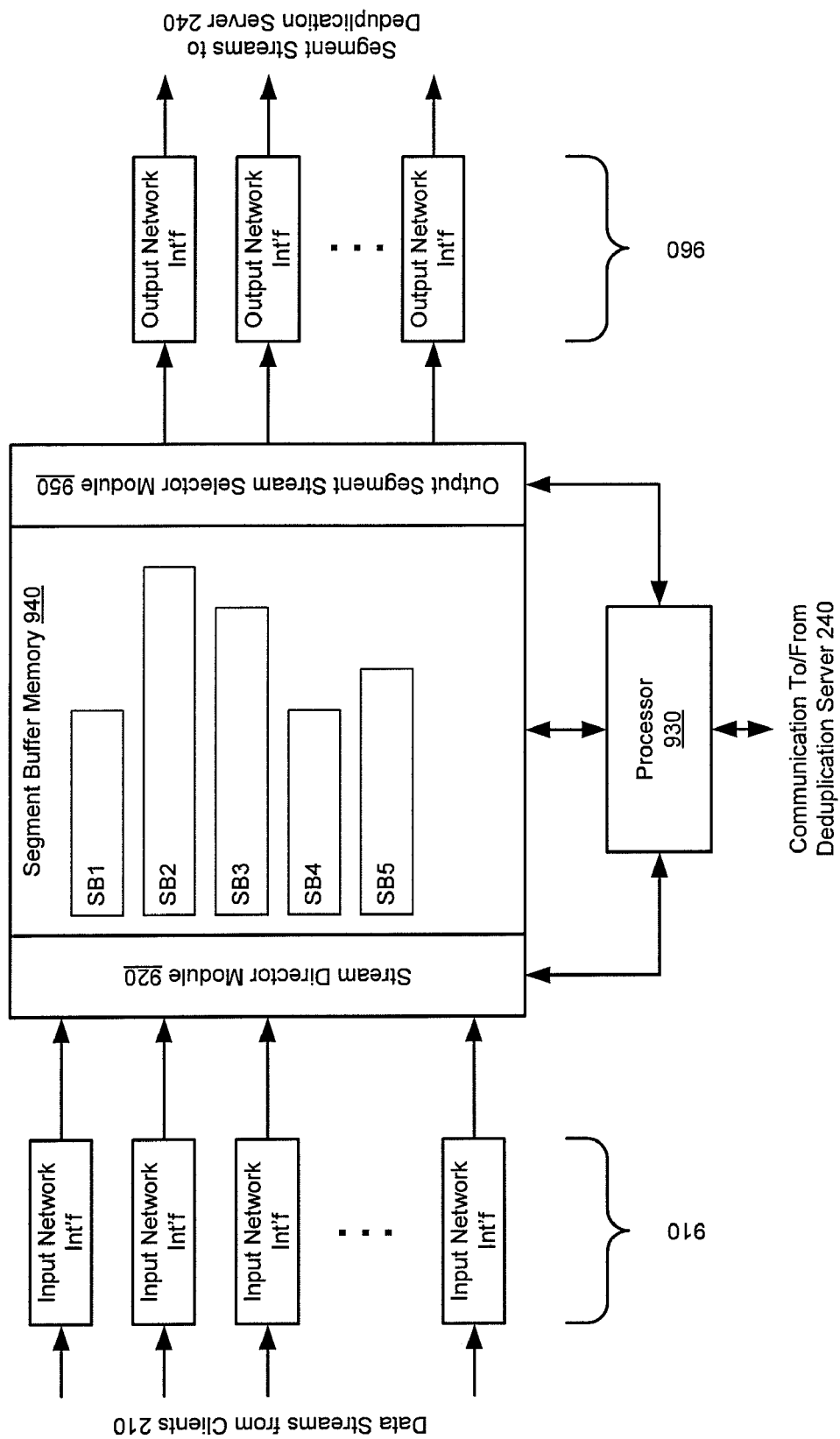
FIG. 9 is a simplified block diagram illustrating one embodiment of a stream segmenter 350 usable in embodiments of the present invention.

FIG. 9 is a simplified block diagram illustrating one embodiment of a stream segmenter 350 usable in accord with the present invention. Stream segmenter 350 incorporates one or more input network interfaces 910 that are configured to receive data streams from clients 210. Each network interface can receive one or more data streams at a time, and stream segmenter 350 can process multiple incoming data streams simultaneously. Data from the incoming data streams is provided to a stream director module 920 which provides data from each incoming data stream to a corresponding selected segment buffer in segment buffer memory 940. As a data stream arrives in stream director module 920, information about the data stream (e.g., unique identifier and sequence number) and data objects in the data stream is provided to processor 930. Processor 930 can determine whether a stream is a first in a sequence for a unique identifier. If so, then the processor can examine a type of a data object received in the data stream and select an appropriate size for a segment for that data object type. An appropriate memory size to store a segment of the selected segment size in segment buffer memory 940. Segment buffer memory can be an amount of memory from which smaller segment buffers are dynamically allocated according to the determined segment sizes for the various data stream data objects received from the clients (e.g., SB1, SB2, SB3, SB4, etc.). Stream director 920 then directs the data from each data stream to the appropriate dynamic segment buffer for that data stream. Alternatively, separate segment buffer memories can be associated with each input network interface 910 within which the appropriate segment size for the incoming data objects are allocated. An advantage of the first approach is that buffer memory space can be more efficiently allocated because each segment buffer does not need to be configured initially to hold the largest possible segment size, a portion of which would then be wasted if smaller segment sizes are needed for a particular data object.

Once a segment buffer (e.g., SB1) is filled with incoming data from a data stream, the segment data is then passed to an output segment stream selector module 950, which can format the segment and provide the segment to an output network interface 960. The output segment stream selector can provide header information for each segment, such as a data stream unique identifier or sequence number of the segment. Output network interfaces 960 then provide the segment stream to an appropriate content router 330. Determination of the appropriate content router is provided by deduplication server 240 and communicated to processor 930.

Embodiments of the present invention employing the above-described mechanism for processing related to an abnormally terminated data stream address the issues of shifted data segments for a re-started data stream. By doing so, embodiments of the present invention avoid storage of duplicate data within a deduplication server by enhancing a probability that duplicate segments may be found for a data object previously stored within the deduplication server. Furthermore, the mechanism of merging truncated segments from the interrupted data stream and the re-started data stream enables a deduplication server to compare the merged segment with segments from a previously stored data object in the deduplication server.

An Example Computing and Network Environment

As shown above, the present invention can be implemented using a variety of computer systems and networks. An example of one such computing and network environment is described below with reference to FIGS. 10 and 11.

Figure 10:
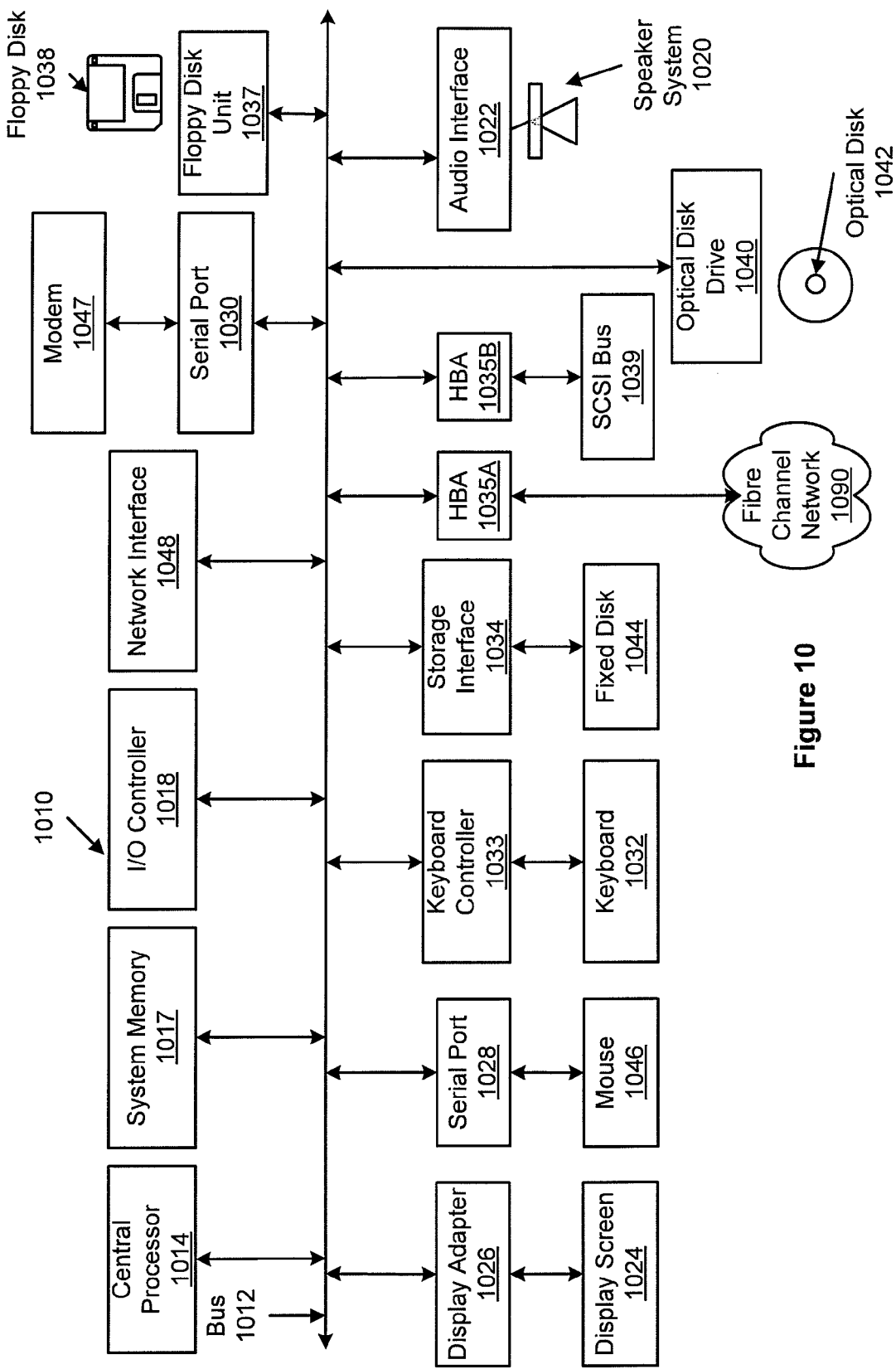
FIG. 10 depicts a block diagram of a computer system suitable for implementing aspects of the present invention.

FIG. 10 depicts a block diagram of a computer system 1010 suitable for implementing aspects of the present invention (e.g., clients 210, backup server 230, and deduplication server 240). Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer-readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present invention. The devices and subsystems can be interconnected in different ways from that shown in FIG. 10. The operation of a computer system such as that shown in FIG. 10 is readily known in the art and is not discussed in detail in this application. Code to implement the present invention can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
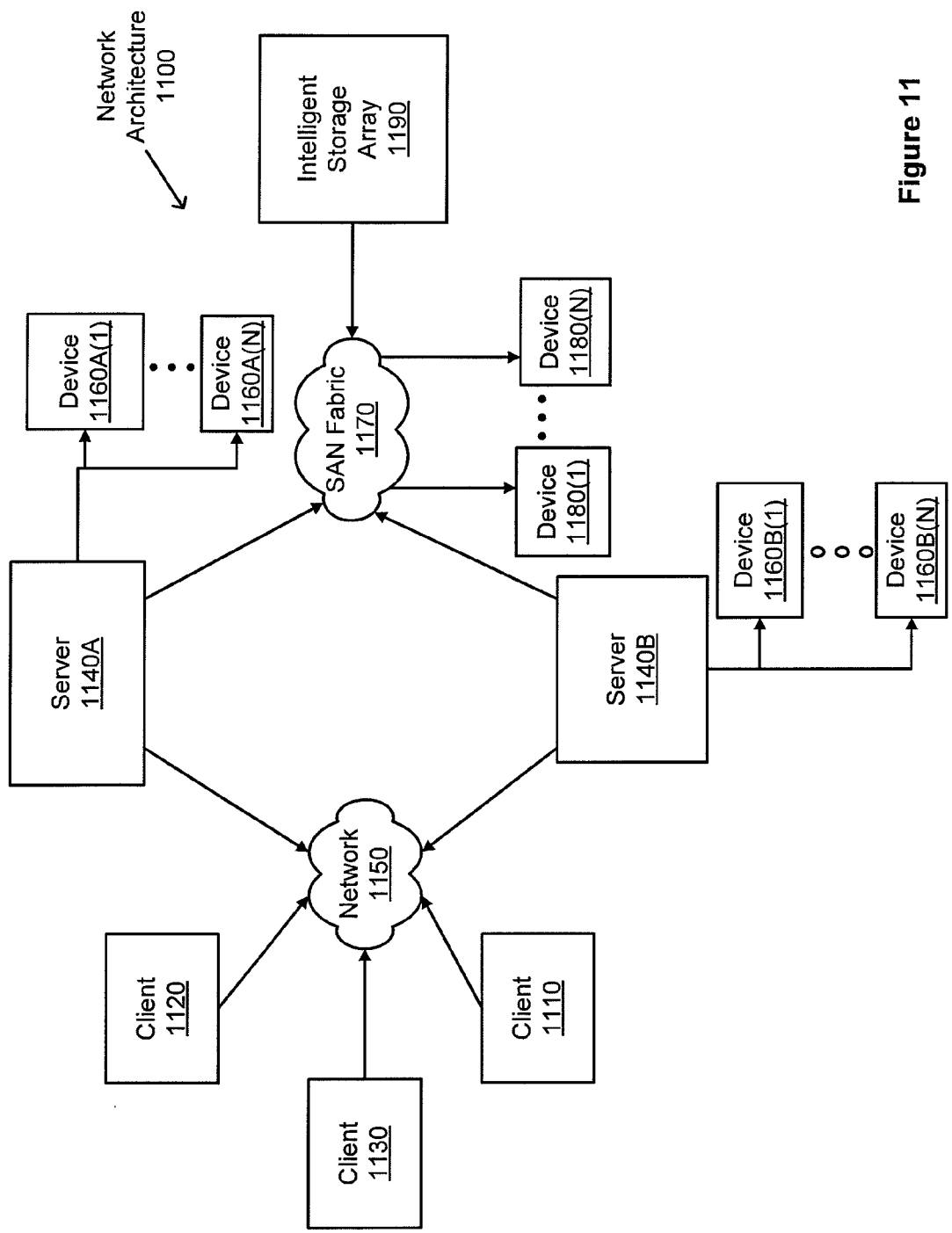
FIG. 11 is a block diagram depicting a network architecture suitable for implementing aspects of the present invention.

FIG. 11 is a block diagram depicting a network architecture 1100 in which client systems 1110, 1120 and 1130, as well as storage servers 1140A and 1140B (any of which can be implemented using computer system 1010), are coupled to a network 1150. Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation of the invention. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1010). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 9.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a current data stream having an associated unique identifier;
   determining whether the current data stream is a first data stream associated with the unique identifier; and
   allocating a segment of memory to contain a first amount of data from the current data stream, wherein
      a size of the segment is determined using an identification of a type of first data object received in the current data stream, and
      the size of the segment is further determined using a size of a last segment of a previous data stream associated with the unique identifier, if the current data stream is not the first data stream associated with the unique identifier.

2. The method of claim 1 wherein said determining whether the current data stream is the first data stream associated with the unique identifier comprises:
   receiving a sequence number associated with the current data stream and the unique identifier; and
   comparing the unique identifier and sequence number pair associated with the current data stream against unique identifier and sequence number pairs associated with previously received data streams.

3. The method of claim 2 further comprising:
   storing the unique identifier and sequence number pair associated with the current data stream for use in a comparing against a unique identifier and sequence number pair associated with a subsequent data stream.

4. The method of claim 3 further comprising:
   storing the size of the segment in association with the unique identifier and sequence number pair.

5. The method of claim 1 wherein said determining the size of the segment using an identification of a type of first data object comprises:
   if the current data stream is the first data stream associated with the unique identifier, then
      reading the first data object type from the current data stream, and
      selecting a segment size corresponding to the first data object type; and
   if the current data stream is not the first data stream associated with the unique identifier, then
      determining the segment size of a last data object of the previous data stream associated with the unique identifier.

6. The method of claim 5 wherein said determining the size of the segment using a size of the last segment of the previous data stream associated with the unique identifier comprises:
   subtracting the size of the last segment of the previous data stream associated with the unique identifier from the segment size of the last data object of the previous data stream associated with the unique identifier.

7. The method of claim 1 further comprising:
   allocating a second segment of memory to contain a second amount of data from the current data stream, wherein
      the size of the second segment is determined using the identification of the type of first data object received in the current data stream; and
   storing the size of the second segment as a last data object segment size in association with the unique identifier.

8. The method of claim 7 further comprising:
   allocating a third segment of memory to contain a third amount of data from the current data stream, wherein
      the size of the third segment is determined using an identification of the type of second data object received in the current data stream; and
   storing the size of the third segment as the last data object segment size in association with the unique identifier.

9. The method of claim 8 further comprising:
   if said receiving the current data stream terminates, then
      closing a current segment containing data received in the current data stream,
      determining an amount of data contained in the current segment, and
      storing the amount of data contained in the current segment as a last segment size in association with the unique identifier.

10. A computer-readable storage medium storing instructions executable by a processor, said instructions comprising:
    a first set of instructions configured to determine whether a current data stream is a first data stream associated with a unique identifier associated with the current data stream, wherein
       the current data stream is received by a network interface coupled to the processor; and
    a second set of instructions configured to allocate a segment of memory to contain a first amount of data from the current data stream, wherein the second set of instructions comprises instructions further configured to
       determine a size of the segment using an identification of a type of first data object received in the current data stream, and
       if the current data stream is not the first data stream associated with the unique identifier, further determine the size of the segment using a size of a last segment of a previous data stream associated with the unique identifier.

11. The computer-readable storage medium of claim 10 wherein said first set of instructions further comprises instructions executable by the processor, said instructions comprising:
    a third set of instructions configured to receive a sequence number associated with the current data stream and the unique identifier; and
    a fourth set of instructions configured to compare the unique identifier and sequence number pair associated with the current data stream against unique identifier and sequence number pairs associated with previously received data streams.

12. The computer-readable storage medium of claim 11 further comprising:
   a fifth set of instructions configured to store the unique identifier and sequence number pair associated with the current data stream for use in a comparing against a unique identifier and sequence number pair associated with a subsequent data stream; and
   a sixth set of instructions configured to store the size of the segment in association with the unique identifier and sequence number pair.

13. The computer readable storage medium of claim 10 wherein said instructions configured to determine the size of the segment using an identification of a type of first data object comprise:
   a third set of instructions, executable if the current data stream is the first data stream associated with the unique identifier, configured to
      read the first data object type from the current data stream, and
      select a segment size corresponding to the first data object type; and
   a fourth set of instructions, executable if the current data stream is not the first data stream associated with the unique identifier, configured to
      subtract the size of the last segment of the previous data stream associated with the unique identifier from the segment size of the last data object of the previous data stream associated with the unique identifier.

14. The computer-readable medium of claim 10, said instructions further comprising:
   a third set of instructions configured to allocate a second segment of memory to contain a second amount of data from the current data stream, wherein
      the size of the second segment is determined using the identification of the type of first data object received in the current data stream; and
   a fourth set of instructions configured to store the size of the second segment as a last data object segment size in association with the unique identifier.

15. The computer-readable medium of claim 14, said instructions further comprising:
   a fifth set of instructions configured to allocate a third segment of memory to contain a third amount of data from the current data stream, wherein
      the size of the third segment is determined using an identification of the type of second data object received in the current data stream; and
   a sixth set of instructions configured to store the size of the third segment as the last data object segment size in association with the unique identifier.

16. The computer-readable medium of claim 15, said instructions further comprising:
   a seventh set of instructions, executable when said receiving the current data stream terminates, and configured to
      close a current segment containing data received in the current data stream,
      determine an amount of data contained in the current segment, and
      store the amount of data contained in the current segment as a last segment size in association with the unique identifier.

17. An apparatus comprising:
   a network interface configured to receive from a remote node a current data stream having an associated unique identifier;
   a segment buffer memory, coupled to the network interface, and comprising memory allocatable to form one or more buffers of corresponding selected sizes; and
   a processor, coupled to the network interface and the segment buffer memory, and configured to
      determine whether the current data stream is a first data stream associated with the unique identifier, and
      allocate a segment of the segment buffer memory to contain a first amount of data from the current data stream, wherein
         a size of the segment is determined using an identification of a type of first data object received in the current data stream, and
         the size of the segment is further determined using a size of a last segment of a previous data stream associated with the unique identifier, if the current data stream is not the first data stream associated with the unique identifier.

18. The apparatus of claim 17 further comprising:
   a stream identifier memory coupled to the processor wherein,
      the memory is configured to store one or more unique identifier and sequence number pairs associated with corresponding one or more previously received data streams,
      the network interface is further configured to receive a sequence number associated with the current data stream and the unique identifier, and
   the processor is further configured to determine whether the current data stream is the first data stream associated with the unique identifier by comparing the unique identifier and sequence number pair associated with the current data stream against the unique identifier and sequence number pairs associated with previously received data streams.

19. The apparatus of claim 18 wherein
   the processor is further configured to store the unique identifier and sequence number pair associated with the current data stream in the stream identifier memory for use in a comparing against a unique identifier and sequence number pair associated with a subsequent data stream,
   the stream identifier memory is further configured to store a segment size in association with each unique identifier and sequence number pair, and
   the processor is further configured to store the size of the segment in association with the unique identifier and sequence number pair in the stream identifier memory.

20. The apparatus of claim 17 wherein
   the processor is further configured to determine the size of the segment using the identification of the type of the first data object by being further configured to
      in response to the current data stream being the first data stream associated with the unique identifier,
         read the first data object type from the current data stream, and
         select a segment size corresponding to the first data object type; and
      in response to the current data stream not being the first data stream associated with the unique identifier, determine the segment size of a last data object of the previous data stream associated with the unique identifier, and subtract the size of the last segment of the previous data stream associated with the unique identifier from the segment size of the last data object of the previous data stream associated with the unique identifier.

* * * * *